No. 740,484. PATENTED OCT. 6, 1903.
R. H. STOCOUM.
PHOTOGRAPHIC RAY FILTER.
APPLICATION FILED MAY 4, 1903.
NO MODEL.
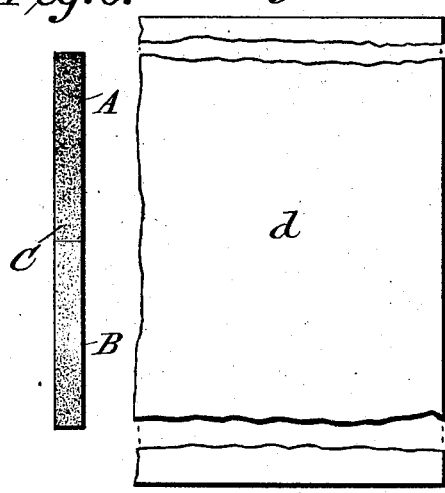
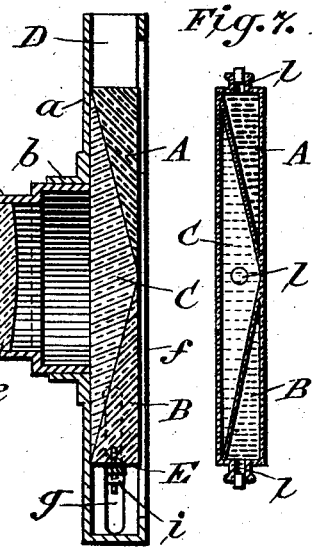
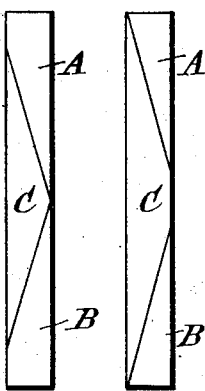
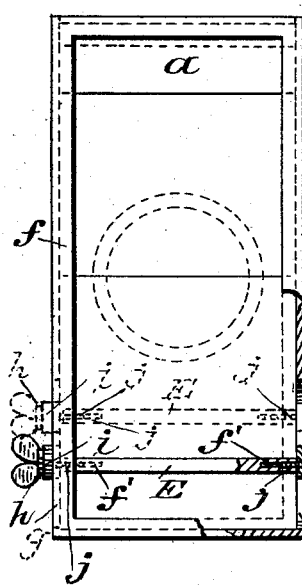
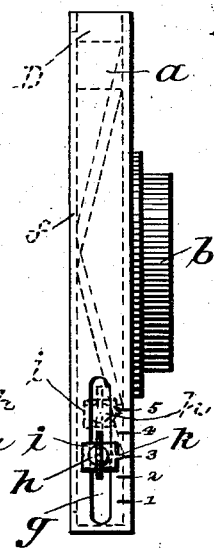
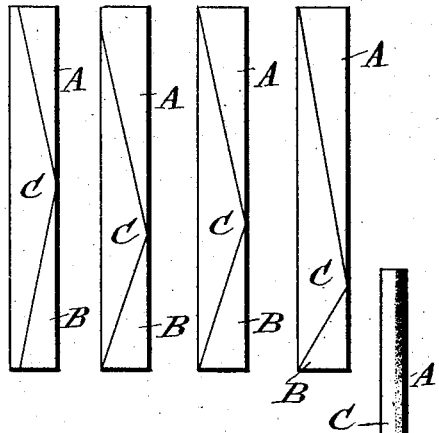
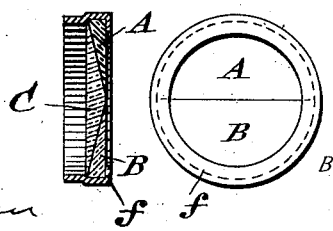
WITNESSES:
Thomas Willsie
Willie G. Stocoum
INVENTOR.
Rollin H. Stocoum.
BY Edward L. Mills
ATTORNEY.

No. 740,484. Patented October 6, 1903.

UNITED STATES PATENT OFFICE.

ROLLIN H. STOCOUM, OF IONIA, MICHIGAN.

PHOTOGRAPHIC RAY-FILTER.

SPECIFICATION forming part of Letters Patent No. 740,484, dated October 6, 1903.

Application filed May 4, 1903. Serial No. 155,572. (No model.)

*To all whom it may concern:*

Be it known that I, ROLLIN H. STOCOUM, a citizen of the United States, residing at Ionia, in the county of Ionia and State of Michigan, have invented certain new and useful Improvements in Photographic Ray-Filters; and I do hereby declare the following to be a full, clear, and exact description of the invention, such as will enable others skilled in the art to which it appertains to make and use the same.

My invention relates to improvements in photographic ray-filters designed for use with photographic lenses.

One object of my invention is to produce a perfectly-balanced negative by gradually accelerating the rays of low actinic value and gradually restricting the rays of high actinic value to produce a true and natural sky effect and at the same time produce a true and natural foreground effect.

Another object of my invention is to produce a balanced negative with both foreground and sky properly timed or timed as they would be in the studio, giving the required time to white or black drapery and also to the face of the person, according to the way used.

There are several modifications in the construction of my invention, some of which are intended for studio or inside work, while others are for general outdoor or landscape photography in its varying conditions.

My invention is designed to overcome the common defect in landscape photography, which is an overtimed sky or undertimed foreground, which is due to the difference in the relative actinic value of each ray found in the solar spectrum. It is a well-known fact that the foreground requires several times the exposure that the sky requires, the rays from which require a different filtering quality, owing to their differing relative actinic values. When an exposure is made for the foreground, the distant landscape and sky are overtimed, and when the sky or upper portion is properly timed the foreground is undertimed. Thus no balanced negative is the result. To overcome this defect, I have constructed my photographic ray-filter in such a manner as to gradually accelerate the rays of low actinic value representing the foreground and gradually restrict the rays of high actinic value representing the sky portion, producing a balanced negative in which both sky and foreground are properly timed. I attain these objects by means of the mechanism herein described, and illustrated by the accompanying drawings, in which—

Figure 1 is a vertical longitudinal section of my improved ray-filter in combination with a casing, lens-tube, and camera, showing also the means for adjusting the same. Fig. 2 is a front view of my improved ray-filter, the casing shown as being detached from the lens-tube of the camera. Fig. 3 is a reversed side elevation of the same. Fig. 4 is a vertical longitudinal section of an ordinary tubular case containing a modified form of my improved ray-filter. Fig. 5 is an end or front view of the same. Figs. 6, 7, 8, 9, 10, 11, 12, 13, and 14 are modified forms of my improved ray-filter, shown in elevation.

Referring to Figs. 1, 2, and 3, $a$ indicates a casing rectangular in form, having an outer tubular flange $b$ midway its perpendicular and horizontal length and breadth, which is fitted to lens-tube $c$, secured to a camera $d$. $e$ is an ordinary lens secured within the lens-tube $c$. D is an opening in the upper end of the case $a$, which is of the same or nearly the same dimension as the interior walls of said case $a$, the purpose of which is to allow my improved ray-filter to be inserted within or to be withdrawn therefrom in case it is desired to use different modifications of the same invention. A, B, and C are prisms placed together, having their outer faces parallel to each other and inner tapering surfaces extending from the upper and lower surface of one side of the ray-filter to the opposite side thereof and meeting at a point horizontally at or near its center. Prism A is composed of transparent material and colored, which color is of a low or restricting actinic value. Prism B is a prism composed also of transparent material and colored, which color is of a high actinic value. C is a compensating prism, of transparent material, used to overcome the refraction of the rays of light passing through prism A and prism B, having its thickest portion at or near its horizontal center and its thinnest portion at its top and bottom edges. $f$ is a flange extending around the outer perpendicular surface of the case $a$ to assist in holding my improved ray-filter in position. E indicates a rectangular plate within the lower portion of the case $a$, which is used to support said ray-filter. It has at both ends thereof threaded holes $f'f'$. $gg$ are longitudinal slots formed in the sides of casing $a$ near its bottom, having adjustable pieces $ii$ interposed between the perpendicular surfaces of said slots $gg$.

Adjusting thumb-screws $hh$, having round long-threaded projections $jj$, extend through the center of the adjustable pieces $ii$ and are secured within holes $f'f'$ in the rectangular plate E. On one of the adjustable pieces $ii$ a lug $k$ is formed, which serves as an index, in combination with horizontal lines 1, 2, 3, 4, and 5, to indicate the position of my improved ray-filter.

Referring to Fig. 6, which is a modified form of my improved ray-filter, it is composed of a single piece of transparent material having incorporated therein at its upper portion F a color of low or restricting actinic value, said color graded from its top to or near its horizontal center, and at its bottom portion G a color of high or accelerating actinic value, said color graduated from its bottom to or near the same horizontal center.

Referring to Fig. 7, another modified form of my improved ray-filter is shown, which consists of hollow prismatic cells having openings $lll$ for filling with suitable transparent liquids.

Referring to Fig. 14, I is a plate composed of transparent material on which a coating of gelatin or suitable material is flowed. The upper portion of said coating J is colored with a transparent color of low or restricting actinic value, which color is graded from its top to a point at or near its horizontal center. Its lower portion K also is colored with a transparent color of high actinic value, which color is graded from its bottom to a point at or near the same horizontal center.

In my invention I take the center or near the center of the solar spectrum, generally represented by the distant landscape in outdoor photography, as the medium between the two extremes of high and low actinic values and accelerate gradually from its center downward to its bottom edge the lower rays in their respective order and restrict gradually upward from its center to its top edge the higher rays in their respective order or accelerate to or near the top, as the necessity might require.

The operation of my device is as follows: Suppose it is desired to photograph an ordinary landscape under ordinary conditions. The sky and foreground being nearly equal, the rays of high actinic value passing through prism A are gradually restricted from its top to its bottom or that portion represented by the horizon, and the rays of light passing through prism B are gradually accelerated from its bottom to the same portion represented by said horizon. Thus a perfectly-balanced negative with details in the foreground and sky is produced in a shorter time than could be made without my improved ray-filter. Should it be desired to photograph a landscape without the sky, the indicator $k$ is moved up to the indicating-line 5, as shown in Fig. 3, also by dotted lines in Figs. 2 and 3, which will accelerate the landscape, thus making the required exposure in a much shorter time than normal. Should it be desired to produce a photograph of sky and very distant landscape, the indicator is moved down to the indicating-line 1.

I have by the use of my improved ray-filter in combination with a photographic lens and camera produced negatives showing exceptional fine balance with detail in foreground, intermediate, and sky portions, the same being accomplished with a much shorter exposure than normal for the foreground, using the ordinary brands of plates in common use.

Having thus described my invention, what I claim as new, and desire to secure by Letters Patent, is—

1. A ray-filter for photographic use composed of three transparent prisms, one of which is colored of a low or restricting actinic value, another colored of a high actinic value, in combination with a compensating prism, the whole constructed and arranged so as to restrict the rays of a higher actinic value, down to their horizontal center, and to accelerate the action of the lower rays which are of a lower actinic value up to or near their same horizontal center, whereby the rays of light passing through said ray-filter are perfectly balanced and fall actinically equal on all parts of a sensitive plate.

2. A ray-filter for photographic use, composed of three prisms, one of which is colored of a low or restricting actinic value, having its base at its top, and gradually tapered to its bottom edge or apex, which apex is at the horizontal center of said ray-filter, another which is also colored of a high actinic value, having its base at its bottom and gradually tapered to its upper edge or apex, which apex is at the same horizontal center of said ray-filter, in combination with a compensating prism having its thickest portion at its center, gradually tapered to its top and bottom edges, said tapers being conformed to the combined tapers of the other two prisms, the whole outer surfaces of the ray-filter being parallel to each other, substantially as described.

3. The combination with a photographic lens and camera, of a case having an opening in one of its ends, and slots in its opposite end, a ray-filter for photographic use composed of three prisms one of which is colored of a low or restricting actinic value, having its base at its top, and gradually tapered to its bottom edge, or apex, which apex is at the horizontal center of said ray-filter, another which is also colored of a high actinic value, having its base at its bottom and gradually tapered to its upper edge or apex, which apex is at the same horizontal center of said ray-filter, in combination with a compensating prism having its thickest portion at its center, gradually tapered to its top and bottom edges, said tapers being conformed to the combined tapers of the other two prisms, in combination with means for adjusting, holding and indicating the position of said ray-filter, substantially as described.

4. The combination with an oblong case having an opening at one end thereof and slots at its opposite end, an adjustable ray-filter for photographic use, composed of three prisms, one of which is colored of a low or restricting actinic value, having its base at its top and gradually tapered to its bottom edge or apex, which apex is at the horizontal center of said ray-filter, another one colored of a high actinic value, having its base at its bottom and gradually tapered to its upper edge or apex, which apex is at the same horizontal center of said ray-filter, in combination with a compensating prism having its thickest portion at its horizontal center, gradually tapered to its top and bottom edges, said tapers being conformed to the combined tapers of the other two prisms, the whole being adapted to differentially qualify the rays of light passing through it when adjusted at its highest position, and when adjusted at its highest position the prism B, of high actinic value covers the lens-opening, when adjusted at its lowest position prism A, of low or restricting actinic value, covers the lens-opening, and means for adjusting, holding and indicating the position of said ray-filter, substantially as described.

5. The combination with an oblong case having slots formed therein, an adjustable ray-filter for photographic use composed of three prisms, one of which is colored of a low or restricting, actinic value, having its base at its top and gradually tapered to its bottom edge or apex, which apex is at the horizontal center of said ray-filter, another colored of a high, actinic value, having its base at its bottom and gradually tapered to its upper edge or apex, which apex is at the same horizontal center of said ray-filter, in combination with a compensating prism having its thickest portion at its horizontal center, gradually tapered to its top and bottom edges, said tapers being conformed to the combined tapers of the other two prisms, the whole being adapted to qualify all of the rays which pass through it, and means for adjusting, holding and indicating the position of the ray-filter, substantially as described.

6. The combination with a photographic lens and camera, of a case having an opening in one of its ends, and slots in its opposite end, a ray-filter for photographic use composed of three prisms, one of which is colored of a low or restricting actinic value, having its base at its top, and gradually tapered to its bottom edge or apex, which apex is at the horizontal center of said ray-filter, another which is also colored of a high actinic value, having its base at its bottom and gradually tapered to its upper edge or apex, which apex is at the same horizontal center of said ray-filter, in combination with a compensating prism having its thickest portion at its center, gradually tapered to its top and bottom edges, said tapers being conformed to the combined tapers of the other two prisms, and means for holding the ray-filter on a lens-tube, substantially as described.

In testimony whereof I affix my signature in presence of two witnesses.

ROLLIN H. STOCOUM.

Witnesses:
THOMAS WILLSIE,
NELLIE G. STOCOUM.